United States Patent [19]

Wardenier et al.

[11] Patent Number: 4,916,965
[45] Date of Patent: Apr. 17, 1990

[54] MOTOR-VEHICLE SHIFT LINKAGE

[75] Inventors: Wilhelm M. T. Wardenier, Wehrheim; Bruno Hotz, Schwieberdingen, both of Fed. Rep. of Germany

[73] Assignee: RCS Remote Control Systems GmbH, Bod Hamburg, Fed. Rep. of Germany

[21] Appl. No.: 277,339

[22] Filed: Nov. 29, 1988

[30] Foreign Application Priority Data

Nov. 30, 1987 [DE] Fed. Rep. of Germany ... 8715835[U]
Jul. 18, 1988 [DE] Fed. Rep. of Germany ....... 3424296

[51] Int. Cl.$^4$ .............................................. G05G 9/16
[52] U.S. Cl. .................. 74/473 P; 74/471 XY; 74/501.6
[58] Field of Search ........... 74/473 R, 501.6, 421 XY, 74/502.1, 473 P

[56] References Cited

U.S. PATENT DOCUMENTS

| 4,152,950 | 5/1979 | Langford .................. 74/501.6 X |
| 4,453,428 | 6/1984 | Kobelt ..................... 74/501.6 |
| 4,483,211 | 11/1984 | Hurlow .................... 74/501.6 X |
| 4,524,634 | 6/1985 | Haupt ...................... 74/501.6 X |
| 4,619,152 | 10/1986 | Suzuki ..................... 74/473 R |
| 4,712,640 | 12/1987 | Leigh-Monstevens et al. ... 74/473 R X |

Primary Examiner—Peter A. Aschenbrenner
Attorney, Agent, or Firm—Herbert Dubno; Andrew Wilford

[57] ABSTRACT

A shift linkage is used in combination with a shift lever displaceable in two substantially perpendicular directions and with a transmission having an operating shaft extending along an axis and displaceable axially and angularly to change gears. The linkage comprises a first selecting lever extending radially from the shaft, fixed for joint angular movement with the shaft, and having an outer and forming a plurality of like attachment points and a second selecting lever pivoted on the transmission and having one end engaged with the shaft for joint axial movement while permitting relative angular movement and another end forming a plurality of like attachment points. A two-arm lever carried on the shift lever has offset in the one direction from the lever end an attachment region forming a plurality of like first attachment points and offset in the other direction from the lever another attachment region forming a plurality of like second attachment points, A pair of tension- and compression-transmitting cables each have a sleeve and a core slidable longtitudinally therein and having a pair of opposite ends. Connectors secure one end of one of the cores at one of the first points to the two-arm lever and the opposite end thereof to one of the attachment points of the first selecting lever and secure one end of the other core at one of the second points to the two arm lever and the opposite end thereof to one of the attachment points of the second selecting lever.

12 Claims, 3 Drawing Sheets

U.S. Patent   Apr. 17, 1990   Sheet 1 of 3   4,916,965
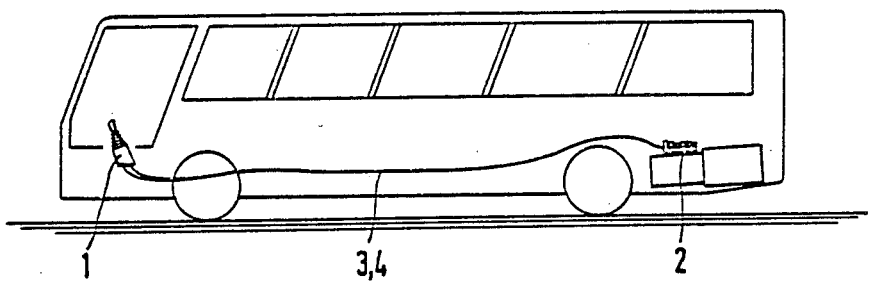
FIG.1
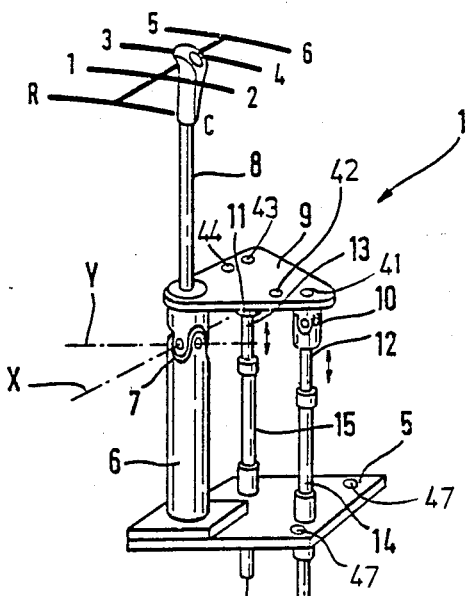
FIG.2
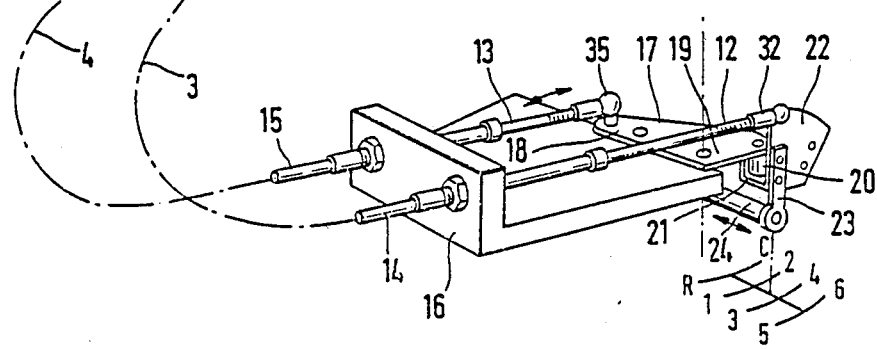

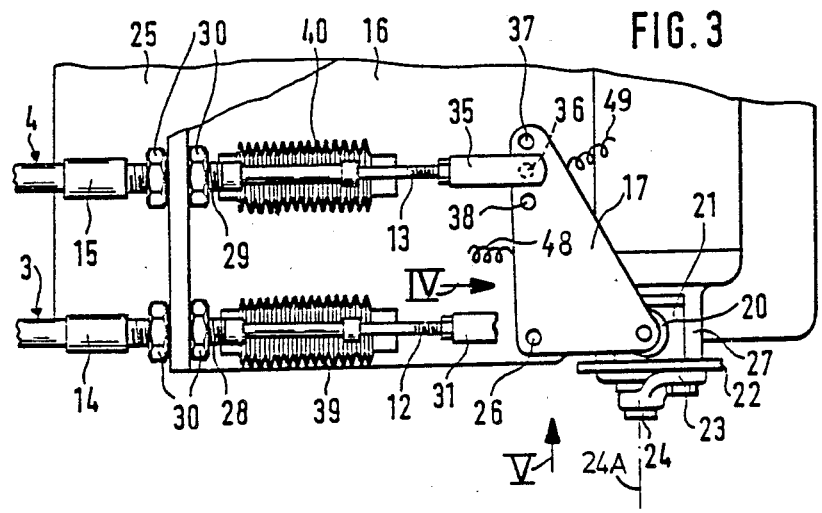
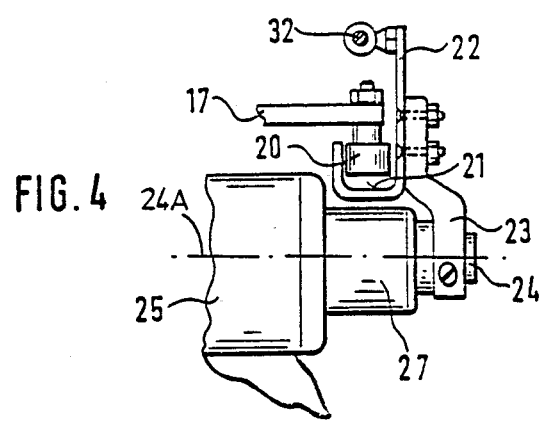
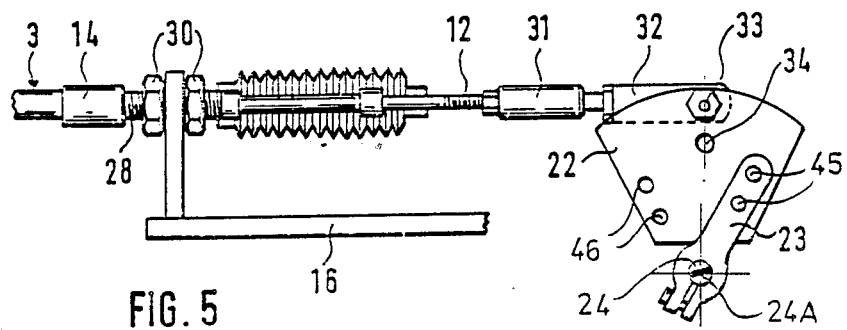

MOTOR-VEHICLE SHIFT LINKAGE

FIELD OF THE INVENTION

The present invention relates to shift linkage for a motor vehicle. More particularly this invention concerns the mechanism that actuates, normally from a short distance, the shifting element of a motor-vehicle transmission.

BACKGROUND OF THE INVENTION

A motor-vehicle transmission is normally situated at a short distance at least from the driver's seat and normally has an operating element which is moved in two directions to select any of a plurality of different gears. The driver's station is provided with a lever which can be moved in two orthogonal directions to select the desired gear, and a linkage having a pair of tension- and compression-transmitting bowden cables connects this lever to the transmission operating member. Movement of the lever in one of its two directions is transmitted to the operating member by pushing or pulling on the core of one of the cables, and in the other direction via the core of the other cable. The operating element of the transmission is typically a shaft that can be rotated about its axis and displaced along its axis to change transmission ratios and/or directions.

As described in U.S. Pat. No. 4,483,211 of R. H. Hurlow the shift lever is connected below the vehicle floor via ball joints to the cores of the two bowden cables. Above the floor the lever is bent so that it can be twisted about its axis to move the cable that is connected under the floor to a radial outrigger. On the transmission is a linkage frame or housing which carries the transmission shaft which is provided with a lever to whose outer end is fixed one of the cables. A two-arm lever on this housing has one arm connected to the other cable and another arm engaged in a groove of the transmission shaft.

This system has the considerable disadvantage that it only works with a specific transmission lever, transmission, and type of cable. In addition it does not allow a user to set the shifter for a different feel or response; a notchy response cannot be adjusted to be a soft one or vice versa.

OBJECTS OF THE INVENTION

It is therefore an object of the present invention to provide an improved shift linkage for a motor vehicle.

Another object is the provision of such an improved shift linkage for a motor vehicle which overcomes the above-given disadvantages, that is which is usable with different configurations and that, even within the same configuration, permits different characteristics to be set.

SUMMARY OF THE INVENTION

The instant invention is a shift linkage used in combination with a shift lever having an end displaceable in two substantially perpendicular directions and with a transmission having an operating shaft extending along an axis and displaceable axially and angularly to change gears. The linkage comprises a first selecting lever extending radially from the shaft, fixed for joint angular movement with the shaft, and having an outer end forming a plurality of like attachment points and a second selecting lever pivoted on the transmission and having one end engaged with the shaft for joint axial movement while permitting relative angular movement and another end forming a plurality of like attachment points. A two-arm lever carried on the end of the shift lever has offset in the one direction from the lever end an attachment region forming a plurality of like first attachment points and offset in the other direction from the lever another attachment region forming a plurality of like second attachment points. A pair of tension- and compression-transmitting cables each have a sleeve and a core slidable longitudinally therein and having a pair of opposite ends. Connectors secure one end of one of the cores at one of the first points to the two-arm lever and the opposite end thereof to one of the attachment points of the first selecting lever and secure one end of the other core at one of the second points to the two arm lever and the opposite end thereof to one of the attachment points of the second selecting lever. The cores extend generally perpendicularly to the respective directions from the respective attachment points on the two-arm lever and the connectors are releasable and connectable to any of the respective attachment points.

Thus with the system of this invention it is possible by moving the cable ends between attachment points to change the effective lever arms of the various levers. The length of the stroke of the various parts can therefore be changed significantly along with any mechanical advantage. The system can therefore be tailored to the individual equipment and/or driver easily, and can even be changed without any need of new parts.

According to a further feature of this invention the two-arm lever is provided with a pair of respective universal joints connecting the respective cable cores to the respective attachment points. The joints have pivot axes parallel to the directions of movement of the shift lever. In addition the two-arm lever is formed by a plate formed with arrays of holes constituting the respective attachment points.

A base plate beneath the shift lever carries a post having an upper end carrying the shift lever and anchors beneath the respective pluralities of attachment points for the sleeves of the respective cables. A universal joint having pivot axes parallel to the shift-lever movement directions connects the post to the shift lever. In addition the base plate can be secured in any of four 90° offset positions inside the vehicle. Such use of a base plate means that the entire driver's end of the shift linkage can be bolted as a unit to the vehicle floor, with only two holes through this floor for the cables so that installation and maintenance is very easy. The system can therefore be installed in the desired position and, when rotated appropriately, made to bring the greatest force to bear where necessary, normally to place the vehicle in reverse which requires shifting quite a few parts in the transmission.

The first selecting lever according to this invention forms relative to the transmission shaft a radially open notch and the second selecting lever is provided with a roller engaging in the notch. Furthermore, the first selecting lever is provided with a bent plate forming the notch and formed with a plurality of radially offset holes constituting the respective attachment points.

The second selecting lever itself is formed by a triangular plate pivoted on the transmission and springs urge the second selecting lever into a center position.

According to a further feature of this invention the shaft is connected to a massive block that is carried on the shaft and is connected to both cables. Such a block, by its inertia, greatly smooths out shifting response and in effect stores energy so that at the end of the shifting stroke the mass ensures that the transmission is fully engaged. This block further is connected to one of the cables and forms the first selecting lever. It is formed with a plurality of holes constituting the attachment points of the first selecting lever. The center of mass of the block is generally at the axis of the transmission shaft and the block is connected by a collet device to the shaft.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is a small-scale and largely diagrammatic view illustrating the basic system of this invention;

FIG. 2 is a partly diagrammatic view of the main elements of the shift linkage according to the present invention;

FIG. 3 is a top view of the transmission-end parts of the linkage;

FIGS. 4 and 5 are detail views taken in the directions of respective arrows IV and V of FIG. 3.

SPECIFIC DESCRIPTION

Figure 6:
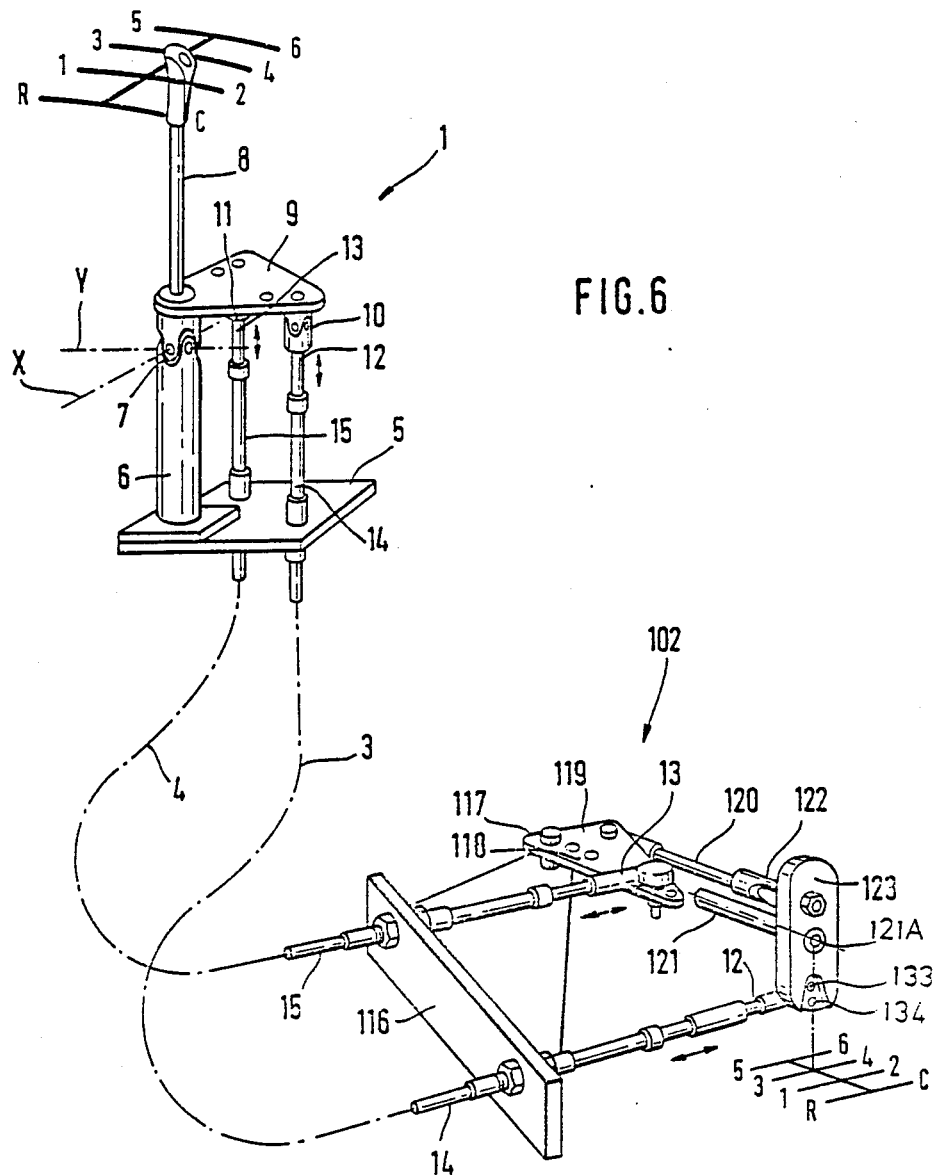
FIG. 6 is a view like FIG. 2 of another linkage according to this invention.

As seen in FIG. 1 a motor vehicle, here a bus, has at its front end at the driver's seat or operator station a shifter 1 connected via a pair of bowden cables 3 and 4 to a transmission 2 at the rear of the bus. The shifter 1 is manipulated through eight different positions to control the direction of the bus and the transmission ratio.

As best seen in FIG. 2 the shifter 1 is mounted on a relatively stationary base plate 5 carrying a fixed post 6 whose upper end carries a universal joint 7 in turn supporting the actual shift lever 8 which can therefore basically tip along two horizontal but mutually perpendicular axes x and y, the latter normally being parallel to the direction of travel of the vehicle. The plate 5 is formed with holes 47 allowing it to be bolted to the floor of the vehicle adjacent the driver in any of four angularly offset positions. The lever 8 carries immediately above the joint 7 a plate 9 basically forming a two-arm lever and having the shape of a right isosceles triangle with the joint 7 at the apex. At one corner, offset in the direction y from the lever 8, are attachment holes 41 and 42 to one of which is secured another universal joint 10 to which in turn is secured the core 12 of the cable 3 whose sleeve 14 is fixed in the plate 5. At the other corner, offset in the direction x from the lever 8, are a plurality of attachment holes 43 and 44 to one of which is secured another universal joint 11 to which in turn is secured the core 13 of the cable 4 whose sleeve 15 is fixed therebelow in the plate 5. Thus rocking the lever 8 along the axis x will shift the core 13 in the core 15 of the cable 4 without moving the core 12 and core 14 of the cable 3 relative to each other, and rocking the lever 8 along the axis y will shift the core 12 in the sleeve 14 of the cable 3 without moving the core 13 in the sleeve 15 of the cable 4.

As also shown in FIGS. 3 through 5 a transmission housing 25 is bolted to an L-shaped support plate 16 in whose upright flange the two sleeves 14 and 15 are secured by means of respective threaded extensions 28 and 29 held in place by adjustment/lock nuts 30. The transmission 2 has a shaft 24 projecting from a bearing 27 and both rotatable about and displaceable along its axis 24A. Fixed to this shaft 24 is a bar 23 bolted at holes 45 or 46 to a plate 22 forming with this bar 23 a first selecting lever 22, 23 that can be pivoted through either of two angularly offset positions each corresponding to four gears of the transmission 2. This lower end of the plate 22 is bent up and in to form a radially outwardly and upwardly open U-shape forming a notch or groove 21. The shaft 24 is movable by means of this groove 21 through four axially offset positions that, combined with the two positions of the lever 22, 23, give a total of eight different gear settings.

Pivoted on a vertical pin 26 radially aligned with the groove 21 in a central position thereof is a horizontal lever/plate 17 having one end provided with a roller 20 engaged in the groove 21 and another end 19 formed with a plurality of attachment holes 36, 37, and 38 to one of which is attached a clip 35 secured to the end of the core 13 of the cable 4 which is surrounded by a protective accordion boot 40 to keep dirt out of its interior. A pair of springs illustrated schematically at 48 and 49 maintain this plate 17 in a center position.

Similarly the plate 22 is formed with a plurality of holes 33 and 34 attached to a clip 32 on a fitting 31 at the end of the core 12 of the cable 3. Another boot 39 like the boot 40 is provided to protect this cable 3.

In the illustrated neutral position of FIG. 1 the plates 9 and 5 are parallel to each other and the selecting levers 22, 23 and 17 are in neutral central positions. Rocking the upper end of the lever 8 parallel to the direction x will shift the core 13 of the cable 4 and move the shaft 24 axially through its four positions. Rocking the lever 8 perpendicular thereto will cause the lever 22, 23 to assume either the position of gears R, 1, 3, or 5 or of gears C, 2, 4, or 6.

If, for instance, the vehicle is to be set up to use strong cables and/or for a person wanting a short notchy feel in the shift, the joints 120 and 11 are moved closer to the joint 7 by attachment at closer holes in the attachment regions. A similar or opposite effect can be achieved by changing the attachment locations on the levers 17 and 22, 23. In addition such adjustment of the attachment points at the ends of the cable cores 12 and 13 allows the starting position and/or the size of the pattern followed by the lever to be changed. The types of cable and even the ease or stiffness of the transmission itself can also be taken into account by appropriate adjustment.

The arrangement of FIG. 6 has a shifter 1 identical to that of FIGS. 2 through 5. Here, however, a transmission shaft 12 which is axially and angularly displaceable like the shaft 24 carries a shift block 123. The sleeves 14 and 15 are seated in a plate 116 like the upturned flange of the plate 16 and the core 12 is attached to one of several points 133, 134 on the block 123 well offset from the axis 121A of the shaft 121. The core 13 is connected to one end 118 of a plate 117 like the plate 17 and having another corner or end 119 connected via a tie rod 120 to a small universal or swivel joint carried on the block 123 offset from the axis 121A. Thus the cable 4 can shift the shaft 121 axially and the cable 3 can twist it, with the joint 122 and the inherent flexibility of the core 12 allowing the necessary ranges of motion.

We claim:
1. In combination with a shift lever having an end displaceable in two substantially perpendicular directions and with a transmission having an operating shaft extending along an axis and displaceable axially and angularly to change gears, a shift linkage comprising:
- a first selecting lever extending radially from the shaft, fixed for joint angular movement with the shaft, and having an outer end forming a plurality of like attachment points;
- a second selecting lever pivoted on the transmission and having one end engaged with the shaft for joint axial movement while permitting relative angular movement and another end forming a plurality of like attachment points;
- a lever plate carried on the end of the shift lever and having offset in the one direction from the lever end an attachment region forming a plurality of like first attachment points and offset in the other direction from the lever another attachment region forming a plurality of like second attachment points;
- a pair of tension- and compression-transmitting cables each having a sleeve and a core slidable longitudinally therein and having a pair of opposite ends;
- a base plate beneath the shift lever;
- a post projecting upward from the base plate and having an upper end carrying the shift lever; and
- anchors in the plate beneath the respective pluralities of attachment points for the sleeves of the respective cables; and
- connector means securing one end of one of the cores at one of the first points to the lever plate and the opposite end thereof to one of the attachment points of the first selecting lever and securing one end of the other core at one of the second points to the lever plate and the opposite end thereof to one of the attachment points of the second selecting lever, the cores extending generally perpendicularly to the respective directions from the respective attachment points on the lever plate, the connector means being releasable and connectable to any of the respective attachment points.

2. The shift linkage defined in claim 1 wherein the lever plate is provided with a pair of respective universal joints connecting the respective cable cores to the respective attachment points, the joints having pivot axes parallel to the directions of movement of the shift lever.

3. The shift linkage defined in claim 2 wherein the lever plate is formed with arrays of holes constituting the respective attachment points.

4. The shift linkage defined in claim 1, further comprising
a universal joint having pivot axes parallel to the shift-lever movement directions connecting the post to the shift lever.

5. The shift linkage defined in claim, 1 further comprising
means for securing the base plate in any of four 90° offset positions inside the vehicle.

6. The shift linkage defined in claim 1 wherein the first selecting lever forms relative to the transmission shaft a radially open notch, the second selecting lever being provided with a roller engaging in the notch.

7. In combination with a shift lever having an end displaceable in two substantially perpendicular directions and with a transmission having an operating shaft extending along an axis and displaceable axially and angularly to change gears, a shift linkage comprising:
- a first selecting lever extending radially from the shaft, forming a notch open radially of the transmission shaft, fixed for joint angular movement with the shaft, and having an outer end forming a plurality of like attachment points;
- a second selecting lever pivoted on the transmission and having one end provided with a roller engaged via the notch with the shaft for joint axial movement while permitting relative angular movement and another end forming a plurality of like attachment points;
- a lever plate carried on the end of the shift lever and having offset in the one direction from the lever end an attachment region forming a plurality of like first attachment points and offset in the other direction from the lever another attachment region forming a plurality of like second attachment points;
- a pair of tension- and compression-transmitting cables each having a sleeve and a core slidable longitudinally therein and having a pair of opposite ends; and
- connector means securing one end of one of the cores at one of the first points to the lever plate and the opposite end thereof to one of the attachment points of the first selecting lever and securing one end of the other core at one of the second points to the lever plate and the opposite end thereof to one of the attachment points of the second selecting lever, the cores extending generally perpendicularly to the respective directions from the respective attachment points on the two-arm lever, the connector means being releasable and connectable to any of the respective attachment points, the first selecting lever being provided with a bent plate forming the notch and formed with a plurality of radially offset holes constituting the respective attachment points.

8. The shift linkage defined in claim 1 wherein the second selecting lever is formed by a triangular plate pivoted on the transmission.

9. In combination with a shift lever having an end displaceable in two substantially perpendicular directions and with a transmission having an operating shaft extending along an axis and displaceable axially and angularly to change gears, a shift linkage comprising:
- a block carried on the shaft and forming a first selecting lever extending radially from the shaft, fixed for joint angular movement with the shaft, and having an outer end forming a plurality of like attachment points;
- a second selecting lever pivoted on the transmission and having one end engaged via the block with the shaft for joint axial movement while permitting relative angular movement and another end forming a plurality of like attachment points;
- a lever plate carried on the end of the shift lever and having offset in the one direction from the lever end an attachment region forming a plurality of like first attachment points and offset in the other direction from the lever another attachment region forming a plurality of like second attachment points;
- a pair of tension- and compression-transmitting cables each having a sleeve and a core slidable longitudinally therein and having a pair of opposite ends; and connector means securing one end of one of the cores at one of the first points to the lever plate and the opposite end thereof to one of the attachment points of the first selecting lever and securing one end of the other core at one of the second points to the lever plate and the opposite end thereof to one of the attachment points of the second selecting lever, the cores extending generally perpendicularly to the respective directions from the respective attachment points on the two-arm lever, the connector means being releasable and connectable to any of the respective attachment points.

10. The shift linkage defined in claim 9 wherein the block is directly connected to one of the cables and forms the first selecting lever.

11. The shift linkage defined in claim 10 wherein the block is formed with a plurality of holes constituting the attachment points of the first selecting lever.

12. The shift linkage defined in claim 11 wherein the center of mass of the block is generally at the axis of the transmission shaft.

* * * * *